US012628147B2

(12) United States Patent
Umeda et al.

(10) Patent No.: US 12,628,147 B2
(45) Date of Patent: May 12, 2026

(54) METHOD FOR LOCATING DC CARRIER

(71) Applicant: Nokia Technologies Oy, Espoo (FI)

(72) Inventors: Hiromasa Umeda, Kanagawa (JP);
Petri Juhani Vasenkari, Turku (FI);
Tero Henttonen, Espoo (FI)

(73) Assignee: Nokia Technologies Oy, Espoo (FI)

( * ) Notice: Subject to any disclaimer, the term of this
patent is extended or adjusted under 35
U.S.C. 154(b) by 476 days.

(21) Appl. No.: 18/245,306

(22) PCT Filed: Oct. 26, 2020

(86) PCT No.: PCT/EP2020/080060
§ 371 (c)(1),
(2) Date: Mar. 14, 2023

(87) PCT Pub. No.: WO2022/089719
PCT Pub. Date: May 5, 2022

(65) Prior Publication Data
US 2025/0267644 A1     Aug. 21, 2025

(51) Int. Cl.
*H04L 5/00* (2006.01)
*H04W 72/04* (2023.01)
*H04W 72/0453* (2023.01)
*H04W 72/0457* (2023.01)
*H04W 72/51* (2023.01)

(52) U.S. Cl.
CPC ......... *H04W 72/0457* (2023.01); *H04L 5/001*
(2013.01); *H04W 72/51* (2023.01)

(58) Field of Classification Search
CPC ..... H04L 5/0053; H04L 5/0048; H04L 5/001;
H04L 5/0007; H04L 5/0094; H04L
5/0023; H04L 5/0035; H04L 5/0098;
H04W 72/23; H04W 76/27; H04W
72/0453; H04W 74/0833; H04B 17/345
See application file for complete search history.

(56) References Cited

U.S. PATENT DOCUMENTS 11,160,055 B2 * 10/2021 Kubota ................. H04W 72/20
2017/0245278 A1 * 8/2017 Xue .................... H04W 56/001
(Continued)

OTHER PUBLICATIONS

"3rd Generation Partnership Project; Technical Specification Group
Radio Access Network; NR; User Equipment (UE) radio transmis-
sion and reception; Part 1: Range 1 Standalone (Release 16)", 3GPP
TS 38.101-1, V16.4.0, Jun. 2020, pp. 1-406.
(Continued)

*Primary Examiner* — Sai Aung
(74) *Attorney, Agent, or Firm* — Brake Hughes
Bellermann LLP

(57) ABSTRACT

An apparatus comprising: means for determining one or
more uplink direct current (DC) carriers needed for a radio
band combination (BC); means for determining locations of
each DC carrier of the radio band combination, wherein said
means comprise means for determining a location of at least
one DC carrier of the radio band combination according to
locations of bandwidth part (BWP) carriers; means for
including an indicator about the location of the at least one
DC carrier in an extended DC location reporting in a UE
capability indication; and means for signalling indicators
about the determined location of each DC carrier in a UE
capability indication.

13 Claims, 9 Drawing Sheets

(56) References Cited

U.S. PATENT DOCUMENTS

| | | | | |
|---|---|---|---|---|
| 2018/0368145 A1* | 12/2018 | Abdoli | .................. | H04W 48/12 |
| 2019/0373667 A1* | 12/2019 | Jeon | ........................ | H04L 49/25 |
| 2021/0092560 A1* | 3/2021 | Bao | ....................... | G01S 5/0236 |
| 2022/0131725 A1* | 4/2022 | Li | .......................... | H04L 5/0053 |
| 2022/0312416 A1* | 9/2022 | Venkata | ................. | H04L 5/0094 |
| 2023/0388066 A1* | 11/2023 | Bergström | .............. | H04L 5/001 |

OTHER PUBLICATIONS

"3rd Generation Partnership Project; Technical Specification Group Radio Access Network; NR; User Equipment (UE) radio access capabilities (Release 16)", 3GPP TS 38.306, V16.2.0, Sep. 2020, pp. 1-126.

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

"3rd Generation Partnership Project; Technical Specification Group Radio Access Network; NR; NR and NG-RAN Overall Description; Stage 2 (Release 16)", 3GPP TS 38.300, V16.3.0, Sep. 2020, pp. 1-148.

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.3.0, Sep. 2020, pp. 1-83.

"On intra-band CA DC location", 3GPP TSG-RAN4 WG4 Meeting # 96-e, R4-2011472, Agenda: 7.11.1.2.1, Huawei, Aug. 17-28, 2020, 6 pages.

"LO location for intra-band UL CA", 3GPP TSG-RAN WG4 Meeting #96, R4-2010049, Agenda: 7.11.1.2.1, Qualcomm Incorporated, May 2020, 2 pages.

"LS on additional DC location reporting for intra-band UL CA", 3GPP TSG-RAN WG4 Meeting # 96-e, R4-2011906, RAN4, Aug. 17-28, 2020, 2 pages.

"On DC location reporting for intra-band UL CA", 3GPP TSG-RAN meeting #89-e, RP-201746, Huawei, Sep. 14-18, 2020, 5 pages.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.2.1, Sep. 2020, pp. 1-1081.

International Search Report and Written Opinion received for corresponding Patent Cooperation Treaty Application No. PCT/EP2020/080060, dated Jul. 7, 2021, 12 pages.

"More on DC location reporting for Intra band UL CA", 3GPP TSG-RAN WG4 Meeting # 97-e, R4-2015212, Agenda: 7.11.1.3, Nokia, Nov. 2-13, 2020, 5 pages.

"LS on additional DC location reporting for intra-band UL CA", 3GPP TSG RAN WG2#112-e, R2-2010673, RAN4, Aug. 17-28, 2020, 2 pages.

"DC location information reporting", 3GPP TSG-RAN WG2 Meeting #112-e, R2-2009306, Agenda: 6.1.2, Intel Corporation, Nov. 2-12, 2020, 3 pages.

* cited by examiner

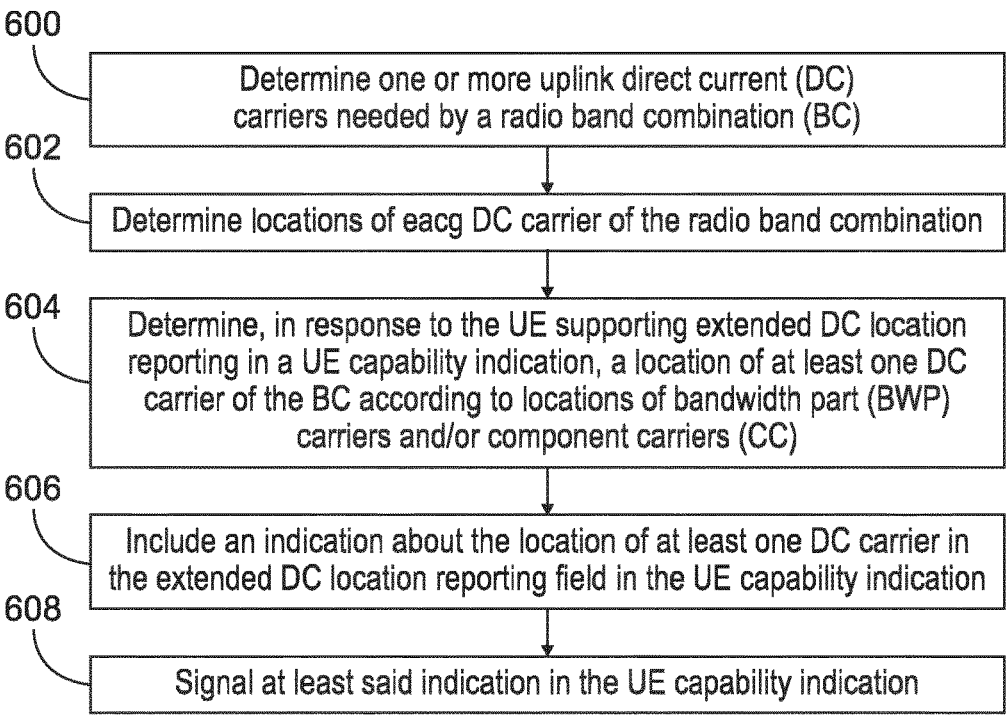

600

Determine one or more uplink direct current (DC) carriers needed by a radio band combination (BC)

602

Determine locations of eacg DC carrier of the radio band combination

604

Determine, in response to the UE supporting extended DC location reporting in a UE capability indication, a location of at least one DC carrier of the BC according to locations of bandwidth part (BWP) carriers and/or component carriers (CC)

606

Include an indication about the location of at least one DC carrier in the extended DC location reporting field in the UE capability indication

608

Signal at least said indication in the UE capability indication

FIG. 6

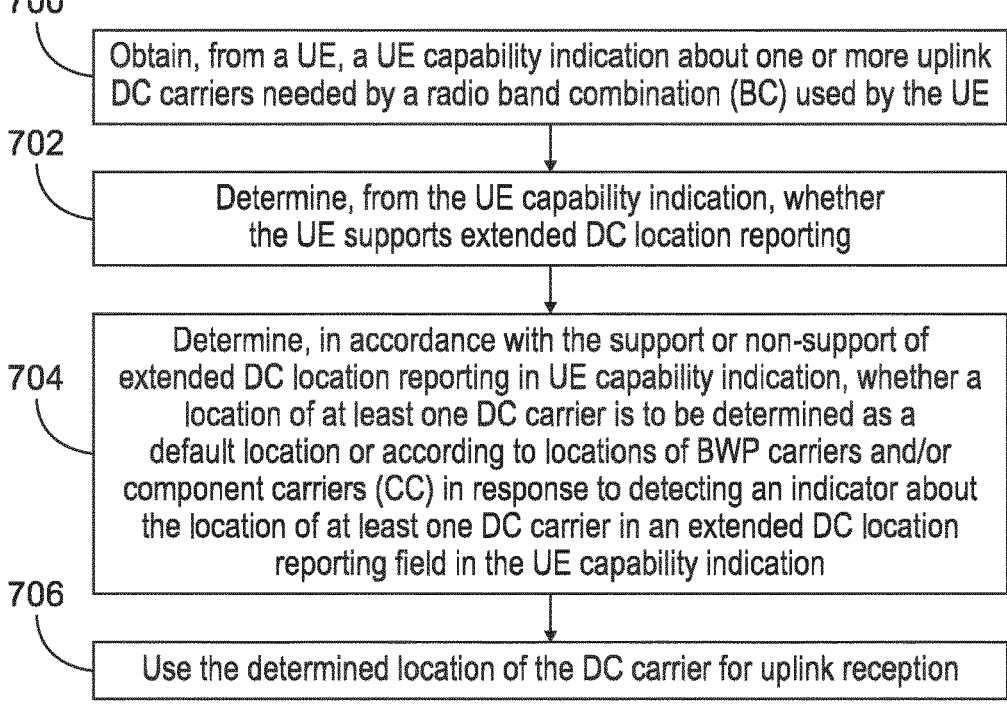

700

Obtain, from a UE, a UE capability indication about one or more uplink DC carriers needed by a radio band combination (BC) used by the UE

702

Determine, from the UE capability indication, whether the UE supports extended DC location reporting

704

Determine, in accordance with the support or non-support of extended DC location reporting in UE capability indication, whether a location of at least one DC carrier is to be determined as a default location or according to locations of BWP carriers and/or component carriers (CC) in response to detecting an indicator about the location of at least one DC carrier in an extended DC location reporting field in the UE capability indication

706

Use the determined location of the DC carrier for uplink reception

FIG. 7

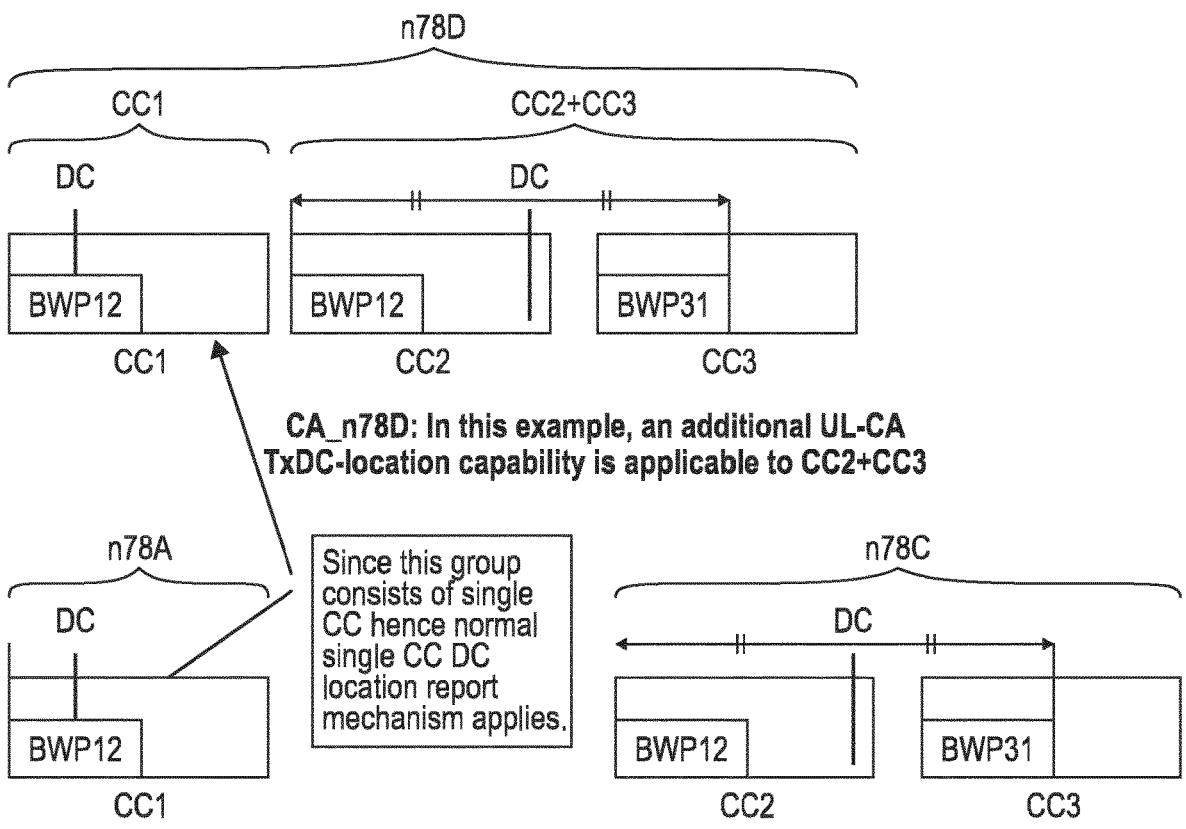

CA_n78D: In this example, an additional UL-CA
TxDC-location capability is applicable to CC2+CC3

Since this group consists of single CC hence normal single CC DC location report mechanism applies.

CA_n78A-n78C: In this example, an additional UL-CA
TxDC-location capability is applicable to CC2+CC3

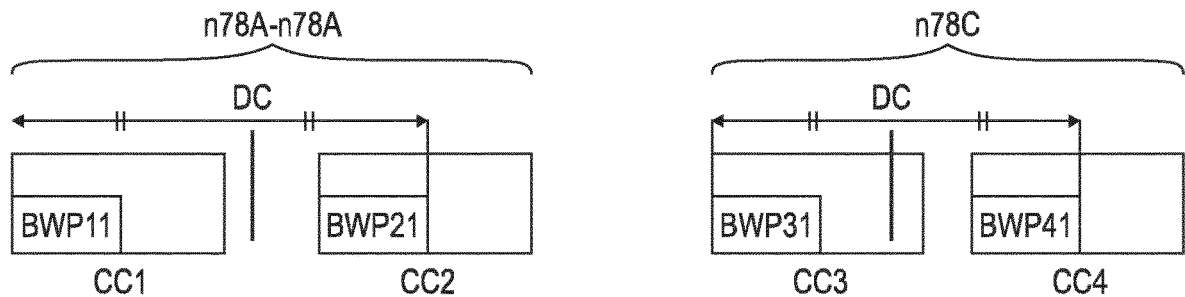

CA_n78A-n78A-n78C: In this example, an additional UL-CA
TxDC-location capability is applicable to both CC1+CC2 and CC3+CC4

FIG. 9B

METHOD FOR LOCATING DC CARRIER

TECHNICAL FIELD

The present invention relates to DC carrier locating operations.

BACKGROUND

One new concept in 5G NR (New Radio) networks is a feature known as bandwidth parts (BWPs). BWPs enable more flexibility in assigning multiple, different signal types to be sent in a given bandwidth. While the 5G base stations typically can utilize the wider bandwidths, the user equipment (UE) capabilities will vary and not all UEs will be capable to use the larger available bandwidths. BWPs enable multiplexing of different signals and signal types for better utilization and adaptation of spectrum and UE power. A UE will always have at least one uplink (UL) BWP and one downlink (DL) BWP configured for each serving cell, and at least one such BWP will be active for both UL and DL.

The UL Direct Current (DC) subcarrier in OFDM is a subcarrier that is not usable for data transmission. As the DC carrier location may vary depending on which UL BWP is used, the UE is required to indicate to the network what is the DC location of each BWP for a single-carrier case. However, as defined in 3GPP Release 15, the UE is not required to report a certain location, such as a center frequency, for any UL BWP but the UE has various options: It may report the center frequency of each UL BWP, but it may also simply choose to indicate the same DC carrier for all UL BWPs. The UE may even indicate the DC carrier location to the network as "outside carrier" or "unknown".

The above arrangement works well with a single-carrier case without any uplink (UL) carrier aggregation (CA). However, for intra-band UL CA, it may not be sufficient as the UE may use either a single power amplifier (PA) or multiple PA architecture (e.g., dual-PA architecture), in which case the DC location for each carrier or multiple carriers which one PA (or each one of the PAs) covers may again change depending on the combination of UL BWPs chosen in each serving cell.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising means for obtaining, from a user equipment (UE), a UE capability indication about one or more uplink direct current (DC) carriers needed by a radio band combination (BC) used by the UE; means for determining, from the UE capability indication whether the UE supports extended DC location reporting; means for determining, in accordance with the support or non-support of extended DC location reporting in UE capability indication, whether a location of at least one DC carrier is to be determined as a default location or according to locations of bandwidth part (BWP) carriers and/or component carriers (CC) in response to detecting an indicator about the location of at least one DC carrier in an extended DC location reporting field in the UE capability indication; and means for using the determined location of the DC carrier for uplink reception.

According to an embodiment, the apparatus comprises means for determining, in response to the UE supporting extended DC location reporting, location of the DC carrier as a center of a lower edge of the lowest active bandwidth part (BWP) and a higher edge of the highest active BWP among all active component carriers (CC) in the radio band combination used by the UE; and means for determining, in response to the UE not supporting extended DC location reporting, location of the DC carrier as a center of a lower edge of the lowest component carrier (CC) and a higher edge of the highest component carrier (CC) among all active component carriers (CC) in the radio band combination used by the UE.

According to an embodiment, the apparatus comprises means for determining, in response to the UE supporting extended DC location reporting and at least one of lowest and highest CCs lacks an active BWP, to replace the lacking BWP by a corresponding CC for the determination of the location of the DC carrier.

According to an embodiment, the apparatus comprises means for determining, in response to the radio band combination used by the UE needing more than one DC carrier, whether the radio band combination (BC) used by the UE comprises at least one group of consisting of one component carrier (CC); and means for determining, in response to at least one group of only one CC is included in the BC, that one location of the DC carrier per a group of only one CC is defined, wherein the location of the DC carrier per a group of only one CC is a DC location of a BWP of said CC reported in the UE capability and/or signalling indication.

According to an embodiment, the apparatus comprises means for determining, in response to the radio band combination used by the UE needing more than one DC carrier, whether the radio band combination (BC) used by the UE comprises at least one group of a plurality of component carriers (CC); means for determining, in response to at least one group of a plurality of CCs is included in the BC, that one location of the DC carrier per a group of a plurality of CCs is defined; means for determining, whether each of the groups of a plurality of CCs supports extended DC location reporting; means for determining, in response to each of the groups of a plurality of CCs supporting extended DC location reporting, the location of the DC carrier as the center of the lower edge of the lowest active bandwidth part (BWP) and the higher edge of the highest active BWP among all active component carriers (CC) in the radio band combination used by the UE; and means for determining, in response to each of the groups of a plurality of CCs not supporting extended DC location reporting, the location of the DC carrier as the center of the lower edge of the lowest component carrier (CC) and the higher edge of the highest component carrier (CC) among all active component carriers (CC) in the radio band combination used by the UE.

An apparatus according to a second aspect comprises at least one processor and at least one memory, said at least one memory stored with computer program code thereon, the at least one memory and the computer program code configured to, with the at least one processor, cause the apparatus at least to perform: obtain, from a user equipment (UE), a UE capability indication about one or more uplink direct current (DC) carrier needed by a radio band combination (BC) used by the UE; determine, from the UE capability indication, whether the UE supports extended DC location reporting; determine, in accordance with the support or non-support of extended DC location reporting in UE capability indication, whether a location of at least one DC carrier is to be determined as a default location or according to locations of bandwidth part (BWP) carriers and/or component carriers (CC) in response to detecting an indicator about the location of at least one DC carrier in an extended DC location reporting field in the UE capability indication; and use the determined location of the DC carrier for uplink reception.

A method according to a third aspect comprises obtaining, from a user equipment (UE), a UE capability indication about one or more uplink direct current (DC) carrier needed by a radio band combination (BC) used by the UE; determining, from the UE capability indication, whether the UE supports extended DC location reporting; determining, in accordance with the support or non-support of extended DC location reporting in UE capability indication, whether a location of at least one DC carrier is to be determined as a default location or according to locations of bandwidth part (BWP) carriers and/or component carriers (CC) in response to detecting an indicator about the location of at least one DC carrier in an extended DC location reporting field in the UE capability indication; and using the determined location of the DC carrier for uplink reception.

An apparatus according to a fourth aspect comprises means for determining one or more uplink direct current (DC) carriers needed for a radio band combination (BC); means for determining locations of each DC carrier of the radio band combination, wherein said means comprise means for determining a location of at least one DC carrier of the radio band combination according to locations of bandwidth part (BWP) carriers and/or component carriers (CC); means for including an indicator about the location of the at least one DC carrier in an extended DC location reporting field in a UE capability indication; and means for signalling at least said indicator in the UE capability indication.

According to an embodiment, the apparatus comprises means for determining, for said at least one DC carrier, the location of the DC carrier as a center of a lower edge of the lowest active bandwidth part (BWP) and a higher edge of the highest active BWP among all active component carriers (CC) in the radio band combination, wherein said indicator about the location of the at least one DC carrier is configured to be included in the extended DC location reporting field.

According to an embodiment, the apparatus comprises means for determining, in response to at least one of lowest and highest component carriers (CCs) lacks an active BWP, to replace the lacking BWP by a corresponding CC for the determination of the location of the DC carrier.

According to an embodiment, the apparatus comprises means for determining the location of the DC carrier as a center of a lower edge of the lowest component carrier (CC) and a higher edge of the highest component carrier (CC) among all active component carriers (CC) in the radio band combination, wherein said indicator about the location of the at least one DC carrier in the extended DC location reporting field is configured to be ignored.

According to an embodiment, the apparatus comprises means for determining whether the radio band combination (BC) used by the UE comprises at least one group of a plurality of component carriers (CC); and means for determining, in response to at least one group of only one CC is included in the BC, that the location of the DC per CC is a BWP of said CC to be reported in the UE capability and/or signalling indication.

According to an embodiment, the apparatus comprises means for determining, in response to at least one group of a plurality of CCs is included in the BC, that one location of the DC carrier per a group of a plurality of CCs is defined; means for determining, whether each of the groups of a plurality of CCs supports extended DC location reporting; means for determining the location of the DC carrier as the center of the lower edge of the lowest active bandwidth part (BWP) and the higher edge of the highest active BWP among all active component carriers (CC) in the radio band combination used by the UE, wherein said determined location is included in an extended DC location reporting in a UE capability indication.

According to an embodiment, the apparatus comprises means for indicating support for the extended DC location reporting in the UE capability indication as radio band combination (BC)-specifically.

According to an embodiment, the apparatus comprises means for including a further indication in the UE capability indication for indicating whether the DC locations are using single- or dual-PA architecture.

An apparatus according to a fifth aspect comprises at least one processor and at least one memory, said at least one memory stored with computer program code thereon, the at least one memory and the computer program code configured to, with the at least one processor, cause the apparatus at least to perform: determine one or more uplink direct current (DC) carriers needed for a radio band combination (BC); determine locations of each DC carrier of the radio band combination, wherein a location of at least one DC carrier of the radio band combination is determined according to locations of bandwidth part (BWP) carriers and/or component carriers (CC); include an indicator about the location of the at least one DC carrier in an extended DC location reporting field in a UE capability indication; and signal at least said indicator in the UE capability indication.

A method according to a sixth aspect comprises determining one or more uplink direct current (DC) carriers needed for a radio band combination (BC); determining locations of each DC carrier of the radio band combination, wherein a location of at least one DC carrier of the radio band combination is determined according to locations of bandwidth part (BWP) carriers and/or component carriers (CC); including an indicator about the location of the at least one DC carrier in an extended DC location reporting field in a UE capability indication; and signalling at least said indicator in the UE capability indication.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which:

FIG. 6 shows a flow chart for a DC locating procedure in a user equipment (UE) according to an embodiment;

FIG. 7 shows a flow chart for a DC locating procedure in a network element according to an embodiment;

FIGS. 9*a* and 9*b* show examples of determining DC locations for more than one DC carrier according to various embodiments;

DETAILED DESCRIPTION OF SOME EXAMPLE EMBODIMENTS

The following describes in further detail suitable apparatus and possible mechanisms carrying out the DC carrier locating operations. While the following focuses on 5G networks, the embodiments as described further below are by no means limited to be implemented in said networks only, but they are applicable in any network supporting DC carrier locating operations.

Figure 1:
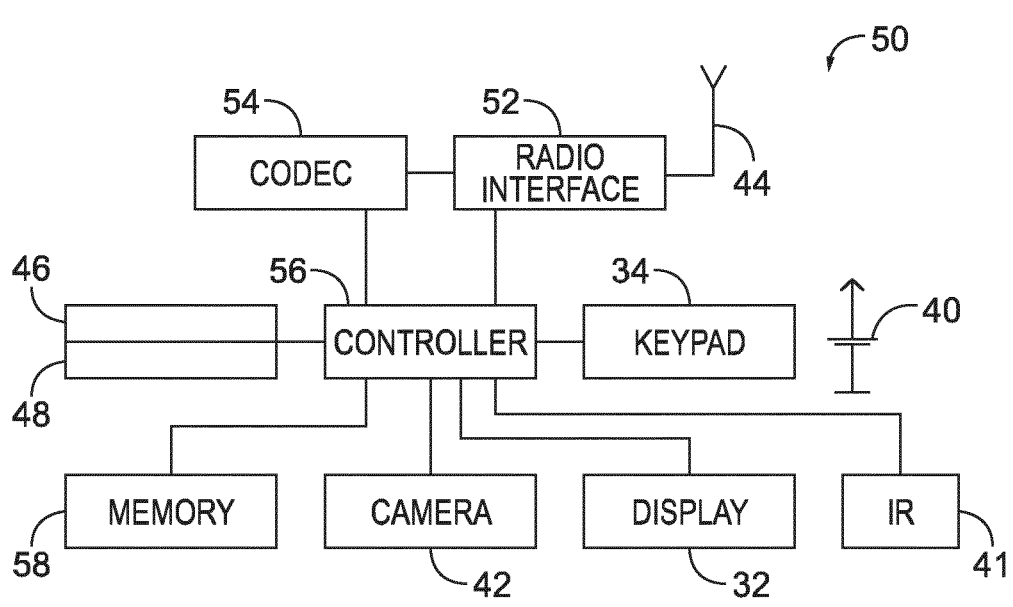
FIG. 1 shows a schematic block diagram of an apparatus for incorporating a dual-SIM/MUSIM arrangement according to the embodiments.
Figure 2:
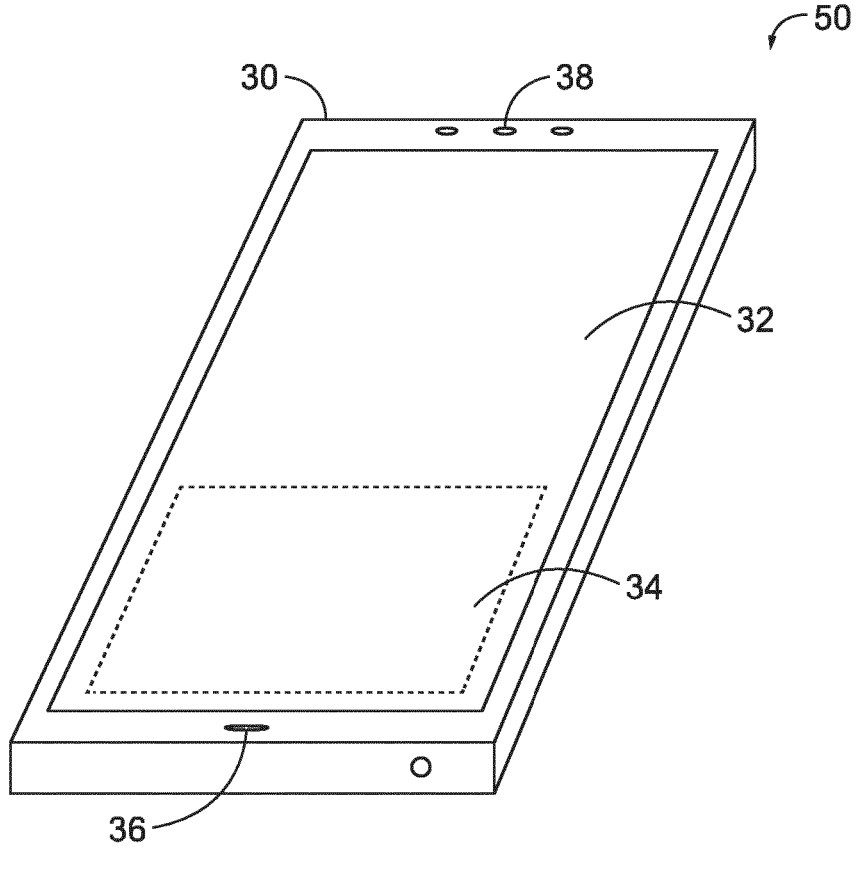
FIG. 2 shows schematically a layout of an apparatus according to an example embodiment.

In this regard, reference is first made to FIGS. 1 and 2, where FIG. 1 shows a schematic block diagram of an exemplary apparatus or electronic device 50, which may incorporate the arrangement according to the embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 3:
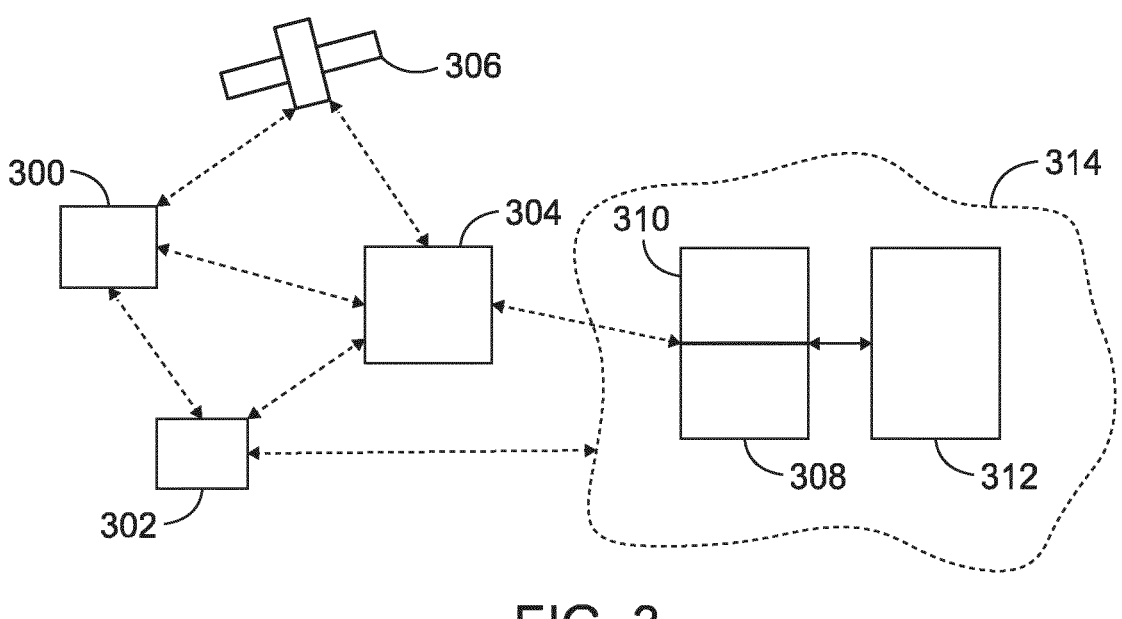
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (e/g)NodeB) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

The 4G/LTE networks support some multi-TRP schemes, but in 5G NR the multi-TRP features are enhanced e.g. via transmission of multiple control signals via multi-TRPs, which enables to improve link diversity gain. Moreover, high carrier frequencies (e.g., mmWaves) together with the Massive MIMO antennas require new beam management procedures for multi-TRP technology.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA_PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states is controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

For the 5G technology, one of the most important design goals has been improved metrics of reliability and latency, in addition to network resilience and flexibility. To meet the requirements of emerging applications such as intelligent transportation, augmented virtual reality, industrial automation, etc, three new service categories has been defined for 5G: enhanced mobile broadband (eMBB), massive machine-type communication (mMTC) and ultra-reliable low-latency communication (URLLC).

The two latest versions of the 5G standard, 3GPP Release 15 and 16, have built the physical implementation of URLLC to meet the two conflicting requirements of reliability and latency. The implementation includes e.g. higher subcarrier spacings and thus shorter OFDM symbol lengths (a.k.a. numerology), sub-slot transmission time intervals, and configured grant resources.

One new concept in 5G NR is a feature known as bandwidth parts (BWPs). BWPs enable more flexibility in assigning multiple, different signal types to be sent in a given bandwidth. While the 5G base stations typically can utilize the wider bandwidths, the UE capabilities will vary and not all UEs will be capable to use the larger available bandwidths. BWPs enable multiplexing of different signals and signal types for better utilization and adaptation of spectrum and UE power.

The higher subcarrier spacings of 5G NR enable maximum carrier bandwidth of up to 100 MHz in FR1 and up to 400 MHz in FR2 that can be aggregated with a maximum bandwidth of 1200 MHz in FR2. BWPs enable the carriers to be subdivided and used for different purposes. Each BWP can be configured differently with its own signal characteristic using a BWP-specific numerology. Thus, UE carriers with different requirements may be integrated into separate BWPs. For example, a first BWP may include carriers with reduced energy requirements, a second BWP may support different services, and a third BWP may include e.g. 4G/LTE carriers.

A BWP is a subset of contiguous common physical resource blocks (PRBs) and BWP configuration parameters include numerology, frequency location, bandwidth size, and control resource set (CORESET). A BWP configuration of a UE may include up to four BWPs in the uplink (per cell) and four BWPs in the downlink (per cell). Only one BWP in the UL and one in the DL are active at a given time. Thus, the UE can transmit PUSCH or PUCCH and receive PDSCH or PDCCH only in an active BWP.

Figure 4A:
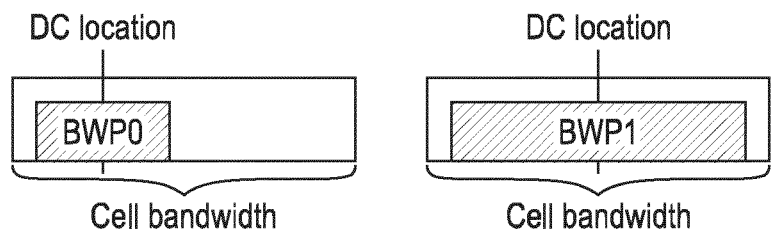
FIGS. 4*a* and 4*b* show examples of signalling DC carrier locations for bandwidth parts (BWPs) for a single-carrier case.

The UL Direct Current (DC) subcarrier in OFDM is a subcarrier that is not usable for data transmission. As the DC carrier location may vary depending on which UL BWP is used, the UE is required to indicate to the network what is the DC location of each UL BWP. FIG. 4a illustrates two examples of per-BWP DC locations. When the network knows the exact DC location of the active BWP being currently used by the UE, the network may optimize its scheduling to avoid the DC location when performing data demodulation.

Figure 4B:
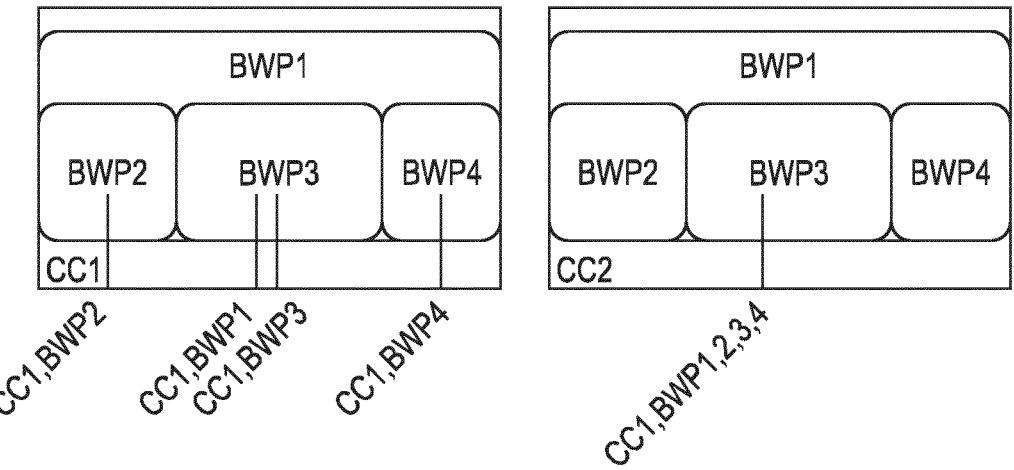

However, as defined in 3GPP Release 15, the UE is not required to report a certain location, such as a center frequency, for any UL BWP but the UE has various options: It may report the center frequency of each UL BWP, as illustrated for component carrier 1 (CC1) in the left part of FIG. 4b, but it may also simply choose to indicate the same DC carrier for all UL BWPs, as illustrated for component carrier 2 (CC2) in the right part of FIG. 4b. The UE may even indicate the DC carrier location to the network as "outside carrier" or "unknown".

The above arrangement works well with a single-carrier case without any UL carrier aggregation (CA). However, for intra-band UL CA for FR1, it may not be sufficient as the UE may use either a single power amplifier (PA) or multiple PA architecture (e.g., dual-PA architecture), in which case the DC location for each carrier or multiple carriers which one PA (or each one of the PAs) covers may again change depending on the combination of BWPs chosen in each serving cell.

For indicating all the possible permutations of the DC locations between the corresponding cells for UL CA per BWP combination, it has been proposed that UE shall report the local oscillator (LO) position to the network after a BWP activation command. However, this would require RRC signalling even after DCI-based BWP switching, which would require additional signalling procedures in radio layer 2.

Figure 5A:
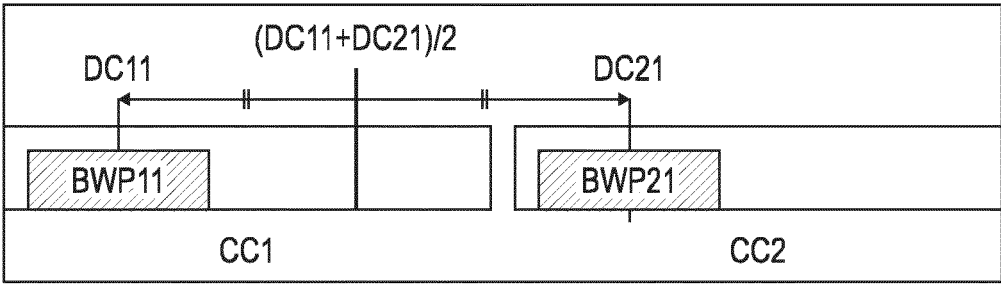
FIGS. 5*a* and 5*b* show further examples of determining DC carrier locations for BWPs.

Another proposal relates to calculating the DC locations according to the BWP center frequencies such that when two component carriers are both activated, the DC location is the frequency point in the middle of DC locations indicated for the two active BWPs, and when only one component carrier is activated, the DC location is the frequency reported for the active BWP. Since the DC location calculated by (DC11+DC21)/2 equals to the center of the DC locations of the BWPs, the above approach works if the BWPs have the same size, as shown in the example of FIG. 5a.

Figure 5B:
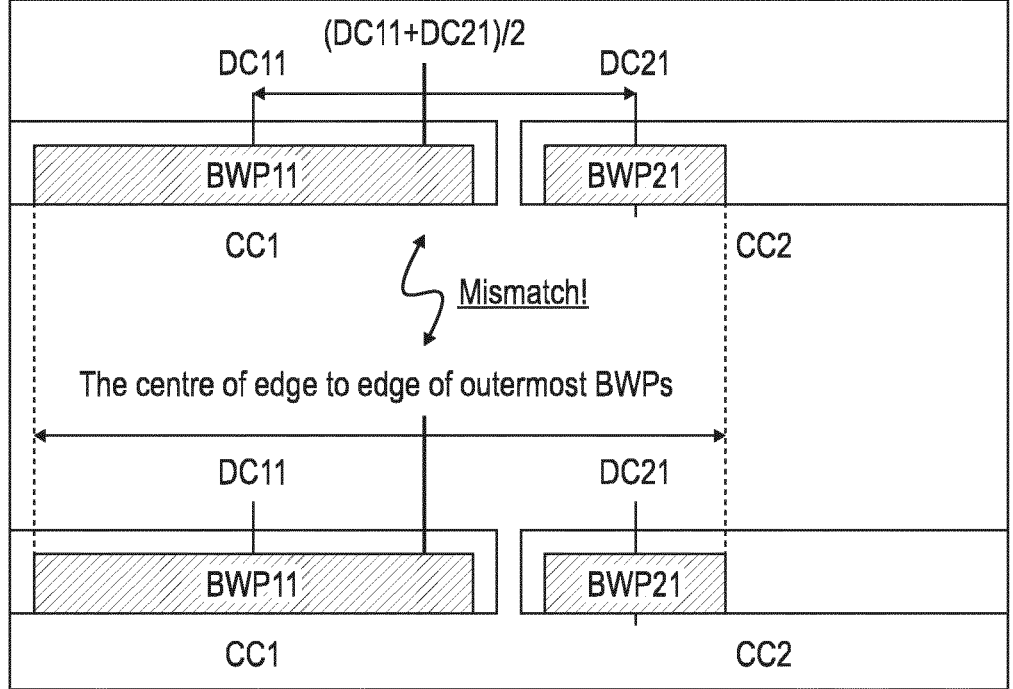

However, if the outermost BWPs have unequal sizes, the DC location for UL CA based on the above approach does not indicate the actual DC location, which is the center calculated as edge-to-edge of the outermost BWPs, as shown in the example of FIG. 5b.

Moreover, as mentioned above, the UE can support up to 4 BWPs per cell. In a 2-cell UL carrier aggregation arrangement, the number of combinations for UL DC locations is 4*4=16 combinations. The signalling cost of reporting a single Tx DC location is 15 bits (i.e. a sum of BWP ID=2 bits, 7.5 kHz shift absence/presence=1 bit and the TxDC carrier location=12 bits), which would result in 16*15=240 bits just for reporting the UL TxDC locations if 4 BWPs are configured per cell. Obviously, in a case of 3-cell UL CA, the number of combinations increases by another fourfold to 64 combinations (with 960 bits). Consequently, the number of bits grows exponentially and generates complexity for both UEs and networks.

Additionally, the above approach assumes that the UE is always forced to retune to use the BWP center frequency (since that is used in the calculation) for single CC transmissions. Since UL CA is configured but not always scheduled for every single transmission, this might require retuning even for single-cell transmissions, which is not feasible in practice as it may cause interruptions to data transmission.

Therefore, it would be preferable to have a simpler mechanism for determining the UL TxDC carrier.

In the following, an enhanced method for determining uplink DC carrier location will be described in more detail, in accordance with various embodiments.

The method, which is disclosed in flow chart of FIG. 6 as reflecting the operation of a terminal apparatus, for example a user equipment (UE), wherein the method comprises determining (600), in a user equipment (UE), one or more uplink direct current (DC) carriers needed for a radio band combination (BC); determining (602) locations of each DC carrier of the radio band combination; determining (604), in response to the UE supporting extended DC location reporting in a UE capability indication, a location of at least one DC carrier of the radio band combination according to locations of bandwidth part (BWP) carriers and/or component carriers (CC); including (606) an indicator about the location of the at least one DC carrier in the extended DC location reporting field in the UE capability indication; and signalling (608) at least said indicator in the UE capability indication.

Thus, the UE capability indication may be enhanced by one or more syntax elements providing support for extended DC location reporting. To maintain the compatibility of the UE capability indication signalling with the previous approaches, the UE does not directly indicate the DC location to the network, but instead the UE and the network have the common rule that enables the network to identify where the DC location is for the UL CA. Thus, for indicating the DC locations to the network, the UE may indicate that it uses a default position, wherein no extended DC location reporting is used, or the UE may use more fine-tuned DC positioning and indicate the DC location(s) using the extended DC location reporting field. It is noted that "field" may be provided with value(s) of one or more variables. A field may, for example, comprise a bit or a field of bits capable of indication two or more predetermined options. In response to receiving the UE capability indication, either with or without the extended DC location reporting, the network may identify, based on the common rule, where the DC location is.

In the following, the operation of the network for concluding at least one DC location of the UE based on the received UE capability indication signalling. The method, which is disclosed in flow chart of FIG. 7 as reflecting the operation of a network element, for example a base station or an access point, such as a gNB, wherein the method comprises obtaining (700), from a user equipment (UE), a UE capability indication about one or more uplink direct current (DC) carriers needed by a radio band combination (BC) used by the UE; determining (702), from the UE capability indication, whether the UE supports extended DC location reporting; determining (704), in accordance with the support or non-support of extended DC location reporting in UE capability indication, whether a location of at least one DC carrier is to be determined as a default location or according to locations of bandwidth part (BWP) carriers and/or component carriers (CC) in response to detecting an indicator about the location of at least one DC carrier in an extended DC location reporting field in the UE capability indication; and using (706) the determined location of the DC carrier for uplink reception.

Thus, no additional signalling from the UE is required, but the network can conclude the DC locations based on UE capability indications sent by the UE in a conventional manner. Especially, the determination of the DC locations depends on whether the UE supports extended DC location reporting.

According to an embodiment, the method comprises determining, in response to the UE supporting extended DC location reporting, location of the DC carrier as a center of a lower edge of the lowest active bandwidth part (BWP) and a higher edge of the highest active BWP among all active component carriers (CC) in the radio band combination used by the UE.

According to an embodiment, the method comprises determining, in response to the UE not supporting extended DC location reporting, location of the DC carrier as a center of a lower edge of the lowest component carrier (CC) and a higher edge of the highest component carrier (CC) among all active component carriers (CC) in the radio band combination used by the UE.

Figure 8A:
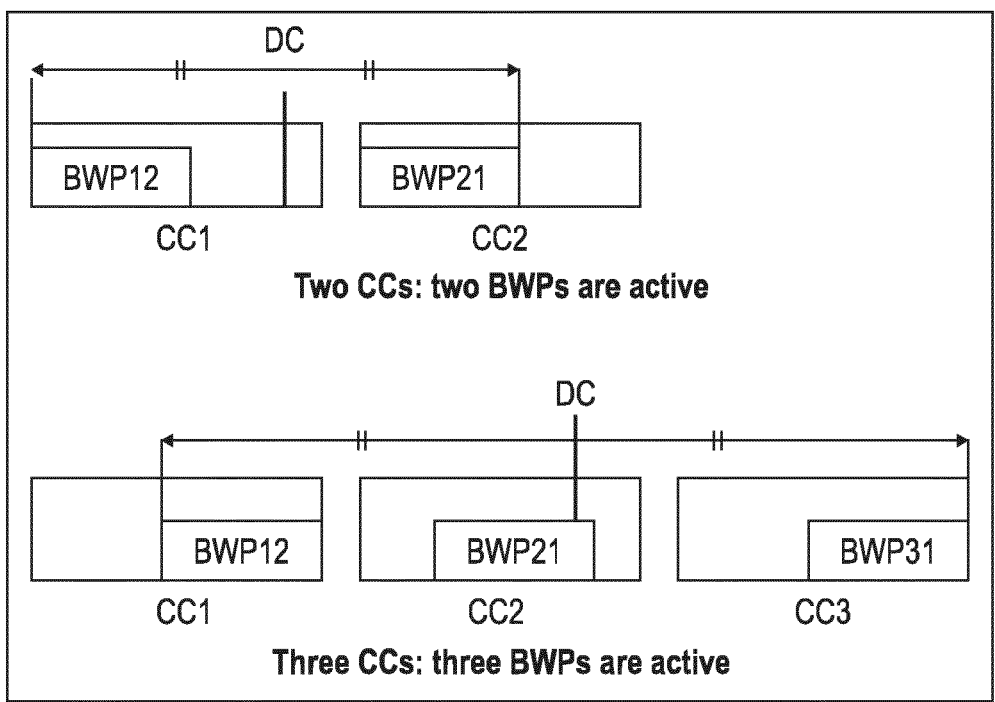
FIGS. 8*a*-8*c* show examples of determining DC locations for one DC carrier according to various embodiments.
Figure 8B:
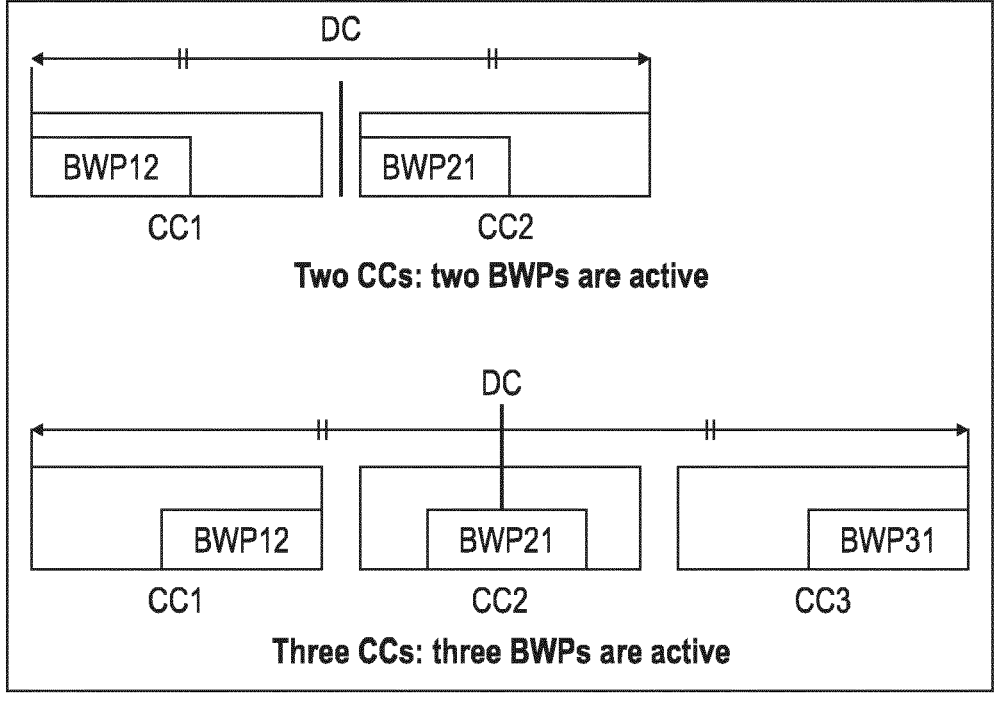
Figure 8C:
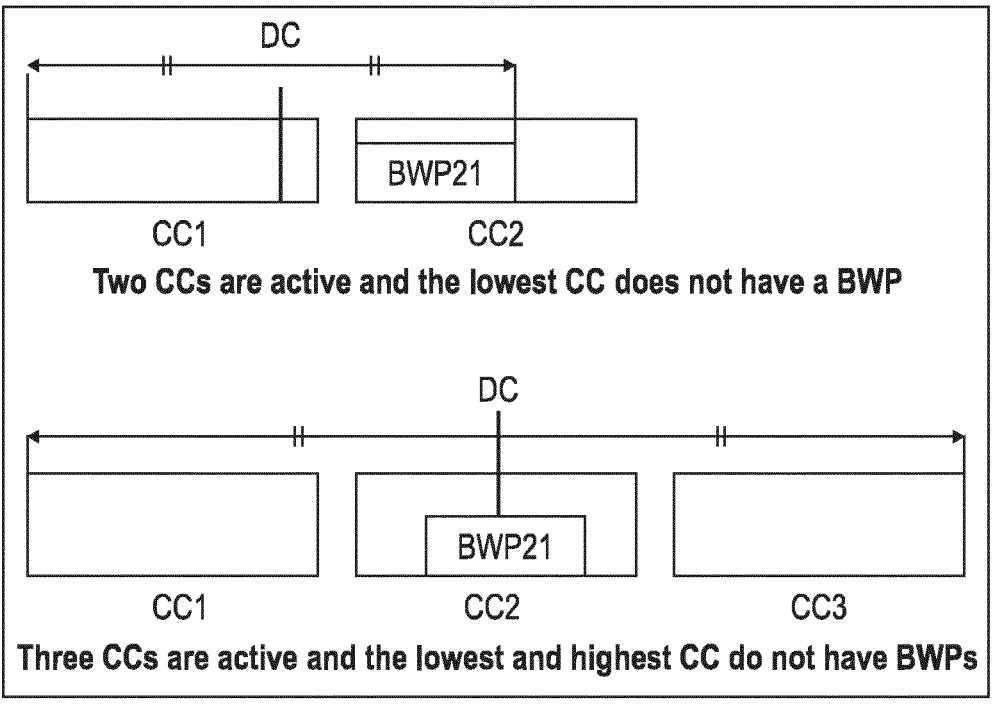

The above options are further illustrated by the examples shown in FIGS. 8a-8c, wherein the uplink carrier aggregation (CA) includes only one DC carrier, for example in a UE using a single PA architecture, wherein the location of said one DC carrier is to be determined.

In the example of FIG. 8a, the UE supports the extended DC location reporting capability for the UL CA, whereupon the network considers the DC location is the center of the lower edge of the lowest active BWP and the higher edge of the highest active BWP among all the active CCs (i.e. the DC location is the center of the minimum bandwidth containing the active BWPs). In the upper part of FIG. 8a disclosing two component carriers CC1 and CC2, the minimum bandwidth containing the active BWPs is the bandwidth between the lower edge of BWP12 and the higher edge of BWP21, and the DC location is the center of this bandwidth. In the lower part of FIG. 8a disclosing three component carriers CC1, CC2 and CC3, the minimum bandwidth containing the active BWPs is the bandwidth between the lower edge of BWP12 and the higher edge of BWP31, and again the DC location is the center of this bandwidth.

In the example of FIG. 8b, the UE does not support the extended DC location reporting capability for the UL CA, whereupon the network considers the DC location is the center of the lower edge of the lowest CC and the higher edge of the highest CC among all the active CCs. In the upper part of FIG. 8b disclosing two component carriers CC1 and CC2, the DC location is the center of the bandwidth between the lower edge of CC1 and the higher edge of CC2. In the lower part of FIG. 8b disclosing three component carriers CC1, CC2 and CC3, the DC location is the center of the bandwidth between the lower edge of CC1 and the higher edge of CC3.

According to an embodiment, the method comprises determining, in response to the UE supporting extended DC location reporting and at least one of lowest and highest CCs lacks an active BWP, to replace the lacking BWP by a corresponding CC for the determination of the location of the DC carrier.

Thus, a serving cell has at least one BWP configured. However, the same or a different serving cell may have a "null BWP", i.e. no actively used BWP. In such situation, only one UL carrier has active BWP but the UE is configured ready to start using UL CA. In that case, if the UE supports an extended DC location reporting capability for the UL CA and if one or two outermost active CC(s) do not have BWP(s), then the lowest and/or the highest BWP is replaced with lowest CC and/or highest CC when determining the DC location.

This is shown in the example of FIG. 8c, where the upper part discloses two component carriers CC1 and CC2, but only CC2 contains an active BWP. Thus, for CC1 lacking the BWP, the lower edge of CC1 is used instead, and hence the DC location is the center of the bandwidth between the lower edge of CC1 and the higher edge of BWP21. In the lower part of FIG. 8c disclosing three component carriers CC1, CC2 and CC3, again only CC2 contains an active BWP. Thus, for CC1 lacking the BWP, the lower edge of CC1 is used instead, and for CC3 also lacking the BWP, the upper edge of CC3 is used instead. Accordingly, the DC location is the center of the bandwidth between the lower edge of CC1 and the higher edge of CC3.

The uplink carrier aggregation (CA) may also include more than one DC carrier, for example in a UE using a dual PA architecture, for example in a case where the channel bandwidth is so wide that one Tx chain may not be able to cover the entire channel bandwidth. Therein, the UE indicates groups consisting of one or more CC(s) and the applicability of an extended DC location reporting capability to each of the groups. Herein, the number of DC locations and the number of the groups are the same, i.e. one DC carrier per group is determined. For example, if the UL CA consists of three CCs (CC1+CC2+CC3) and has two DC locations, there can be two patterns, i.e., pattern 1 (group1, group2)=(CC1, CC2+CC3), pattern 2 (group1, group2)= (CC1+CC2, CC3). Thus, the UE reports which pattern the UL CA supports and indicates the applicability of an extended DC location reporting capability to each of the groups.

According to an embodiment, the method comprises determining, in response to the radio band combination used by the UE needing more than one DC carrier, whether the radio band combination (BC) used by the UE comprises at least one group of consisting of one component carrier (CC); and determining, in response to at least one group of only one CC is included in the BC, that one location of the DC carrier per a group of only one CC is defined, wherein the location of the DC per CC is a DC location of a BWP of said CC reported in the UE capability and/or signalling indication.

Thus, if at least one of the groups consists of one CC, the DC location report mechanism corresponds to the single CC transmission mechanism, as defined 3GPP Release 15. It is noted that the DC location reporting according to 3GPP Release 15 includes indication signalling from the UE to the network, which is not related with UE capabilities. Accordingly, for each CC forming its own group, the location of the DC per CC is the reported DC location of the BWP of said CC.

3GPP Release 15 TS 38.331 defines a syntax element txDirectCurrentLocation, which the UE can use to directly signal the exact position of UL DC carrier, if requested. txDirectCurrentLocation may be assigned with only values in the value range of this field between 0 and 3299, which indicate the subcarrier index within the carrier corresponding to the numerology of the corresponding uplink BWP and value 3300, which indicates "Outside the carrier" and value 3301, which indicates "Undetermined position within the carrier" are used in this version of the specification.

Figure 9A:
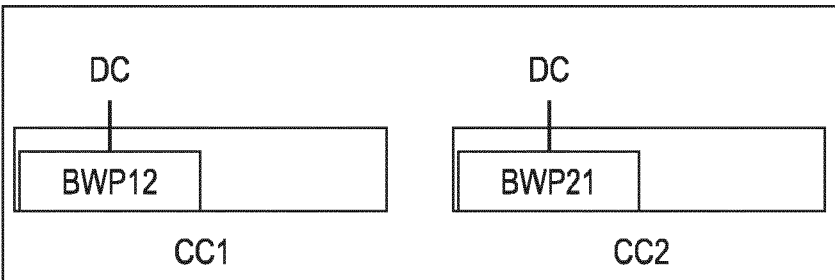

This is illustrated in the example of FIG. 9a, where the two CCs, CC1 and CC2, of the UL CA both form a group of their own. In such case, the network considers that DC location is the reported DC location per BWP per CC. As a result, the extended DC location reporting capability is not taken into account. Such a situation may happen, for example, if the UE using a dual PA architecture implements at least two PAs for the band and UL CA for the band and each one of the PAs covers one CC each for the UL CA.

According to an embodiment, the method comprises determining, in response to at least one group of a plurality of CCs is included in the BC, that one location of the DC carrier per a group of a plurality of CCs is defined; determining, whether each of the groups of a plurality of CCs supports extended DC location reporting; determining, in response to each of the groups of a plurality of CCs supporting extended DC location reporting, the location of the DC carrier as the center of the lower edge of the lowest active bandwidth part (BWP) and the higher edge of the highest active BWP among all active component carriers (CC) in the radio band combination used by the UE; or determining, in response to each of the groups of a plurality of CCs not supporting extended DC location reporting, the location of the DC carrier as the center of the lower edge of the lowest component carrier (CC) and the higher edge of the highest component carrier (CC) among all active component carriers (CC) in the radio band combination used by the UE.

Thus, if at least one of the groups consists of plurality of CCs, only one DC carrier is reported for the whole group of plurality of CCs. Moreover, the UE reports whether each of said groups consisting of plurality of CCs support the extended DC location reporting. Depending on this, the DC locations of each group are determined according to the examples of FIG. 8a or 8b.

This is illustrated in the example of FIG. 9b, where three different scenarios are shown. In each scenario, the UL CA consists of at least three CCs, and at least one group of two CCs is included in each scenario. Accordingly, the UE has to report, for each CC group, whether it supports the extended DC location reporting capability or not. The UE may also indicate additional capability for each group, as described above, to indicate to the network how to interpret the DC carrier locations.

In the uppermost scenario, the UL CA n78D consists of three CCs, where CC1 forms its own group and CC2+CC3 forms another group. Since the group of CC1 consists of one CC, the DC location report mechanism corresponds to the single CC transmission mechanism, as defined 3GPP Release 15. An extended DC location reporting capability, used as an additional UL-CA TxDC-location capability, is applicable to the group of CC2+CC3, and the network determines the DC location as the center of the bandwidth between the lower edge of BWP12 in CC2 and the higher edge of BWP31 in CC3.

In the middlemost scenario, the UL CA n78A-n78C consists of three CCs, where CC1 corresponding to n78A in the UL CA n78A-n78C forms its own group and CC2+CC3 corresponding to n78C in the UL CA n78A-n78C forms another group. Again, the group of CC1 consists of one CC, and therefore the DC location report mechanism corresponds to the single CC transmission mechanism, as defined 3GPP Release 15. An extended DC location reporting capability is applicable to the group of CC2+CC3, and the network again determines the DC location as the center of the bandwidth between the lower edge of BWP12 in CC2 and the higher edge of BWP31 in CC3.

In the lowermost scenario, the UL CA n78A-n78A-n78C consists of four CCs, where CC1+CC2 corresponding to n78A-n78A in the UL CA n78A-n78A-n78C forms its own group and CC3+CC4 corresponding to n78C in the UL CA n78A-n78A-n78C forms another group. An extended DC location reporting capability is applicable to both groups CC1+CC2 and CC3+CC4. The network determines the DC location of group CC1+CC2 as the center of the bandwidth between the lower edge of BWP11 in CC1 and the higher edge of BWP21 in CC2. Similarly, the DC location of group CC3+CC4 is defined as the center of the bandwidth between the lower edge of BWP31 in CC3 and the higher edge of BWP41 in CC4.

Figure 10:
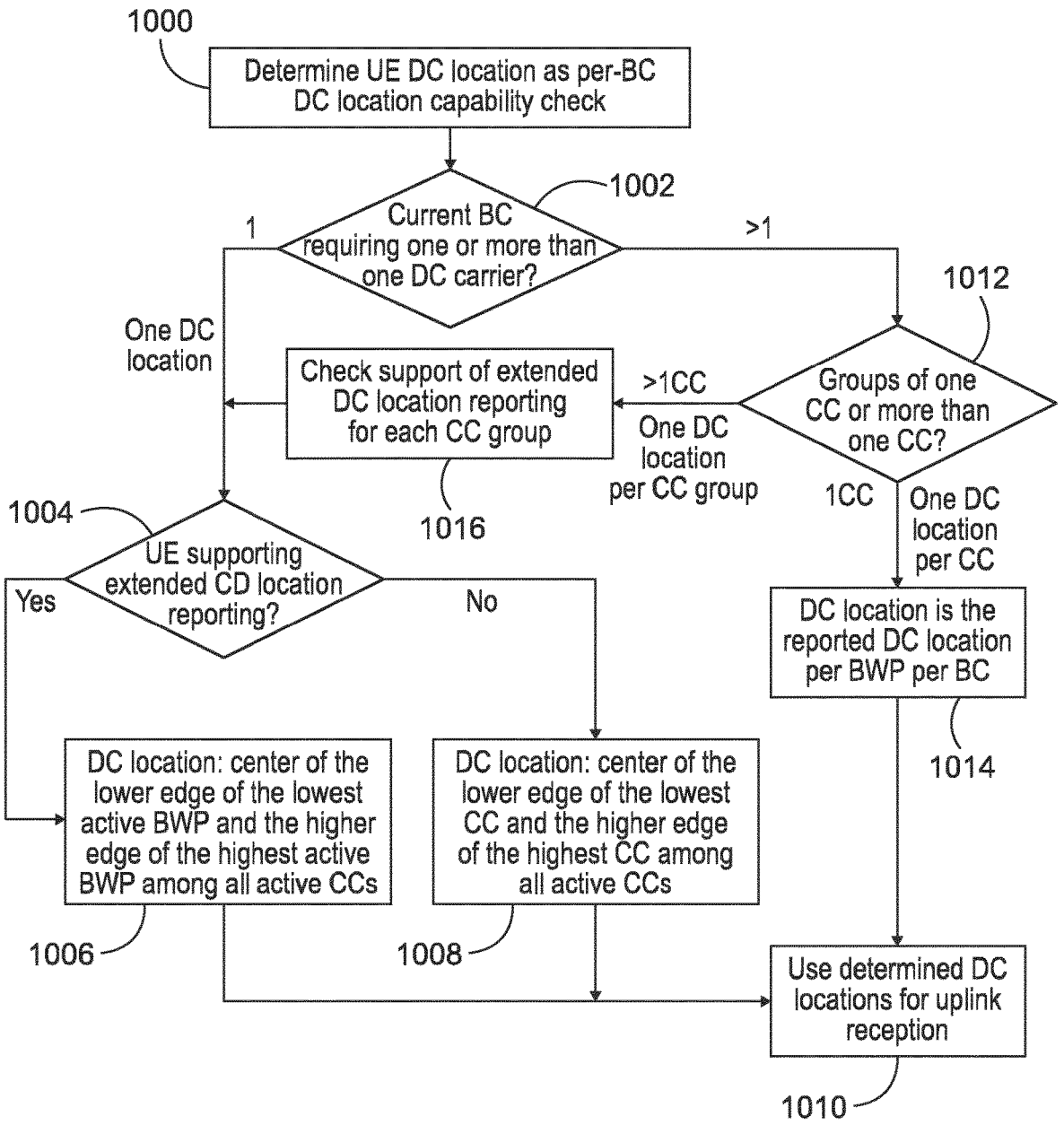
FIG. 10 shows a flow chart for a network for determining UE DC locations according various embodiments.

The flow chart of FIG. 10 illustrates at least some of the above embodiments, where the network determines the DC locations for the UE by checking (1000) the per-band combination DC location capability e.g. from the UE capability indications provided by the UE. The network checks (1002) from the indication if one or more uplink DC carriers are needed for the current band combination (BC). If only one DC carrier is needed, then only one DC location shall be determined. It is checked (1004), whether the UE supports extended DC location reporting, e.g. from the UE capability indication.

If the UE supports extended DC location reporting, location of the DC carrier is determined (1006) as the center of the lower edge of the lowest active bandwidth part (BWP) and the higher edge of the highest active BWP among all active component carriers (CC) in the radio band combination used by the UE. If the UE does not support extended DC location reporting, location of the DC carrier is determined (1008) as the center of the lower edge of the lowest component carrier (CC) and the higher edge of the highest component carrier (CC) among all active component carriers (CC) in the radio band combination used by the UE. Then the network decides (1010) to use the determined location of the DC carrier for uplink reception.

If it is determined at step (1002) above that more than one DC carriers are needed, the network checks (1012), if the groups of component carriers comprise one or more CCs. For each group consisting of a single CC, one DC location shall be determined. The DC location is obtained (1014) from the DC location report mechanism corresponding to the single CC transmission mechanism according to 3GPP Release 15. Similarly, for each group consisting of a plurality of CCs, one DC location shall be determined. For each of said groups, it is checked (1016) whether said group supports extended DC location reporting or not. Depending on the result, either of the above steps (1006) or (1008) is carried out.

The method and the embodiments related thereto may be implemented in an apparatus implementing an access point or a base station of a radio access network, such as an eNB or a gNB. An apparatus, such as a gNB, according to an aspect comprises means for obtaining, from a UE, a UE capability indication about one or more uplink direct current (DC) carriers needed by a radio band combination (BC) used by the UE; means for determining, from the UE capability indication, whether the UE supports extended DC location reporting; means for determining, in accordance with the support or non-support of extended DC location reporting in UE capability indication, whether a location of at least one DC carrier is to be determined as a default location or according to locations of bandwidth part (BWP) carriers and/or component carriers (CC) in response to detecting an indicator about the location of at least one DC carrier in an extended DC location reporting field in the UE capability indication; and means for using the determined location of the DC carrier for uplink reception.

An apparatus according to a further aspect comprises at least one processor and at least one memory, said at least one memory stored with computer program code thereon, the at least one memory and the computer program code configured to, with the at least one processor, cause the apparatus at least to perform: obtain, from a user equipment (UE), a UE capability indication about one or more uplink direct current (DC) carrier needed by a radio band combination (BC) used by the UE; determine, from the UE capability indication, whether the UE supports extended DC location reporting; determine, in accordance with the support or non-support of extended DC location reporting in UE capability indication, whether a location of at least one DC carrier is to be determined as a default location or according to locations of bandwidth part (BWP) carriers and/or component carriers (CC) in response to detecting an indicator about the location of at least one DC carrier in an extended DC location reporting field in the UE capability indication; and use the determined location of the DC carrier for uplink reception.

A further aspect relates to a computer program product, stored on a non-transitory memory medium, comprising computer program code, which when executed by at least one processor, causes an apparatus at least to perform: obtain, from a user equipment (UE), a UE capability indication about one or more uplink direct current (DC) carrier needed by a radio band combination (BC) used by the UE; determine, from the UE capability indication, whether the UE supports extended DC location reporting; determine, in accordance with the support or non-support of extended DC location reporting in UE capability indication, whether a location of at least one DC carrier is to be determined as a default location or according to locations of bandwidth part (BWP) carriers and/or component carriers (CC) in response to detecting an indicator about the location of at least one DC carrier in an extended DC location reporting field in the UE capability indication; and use the determined location of the DC carrier for uplink reception.

Figure 11:
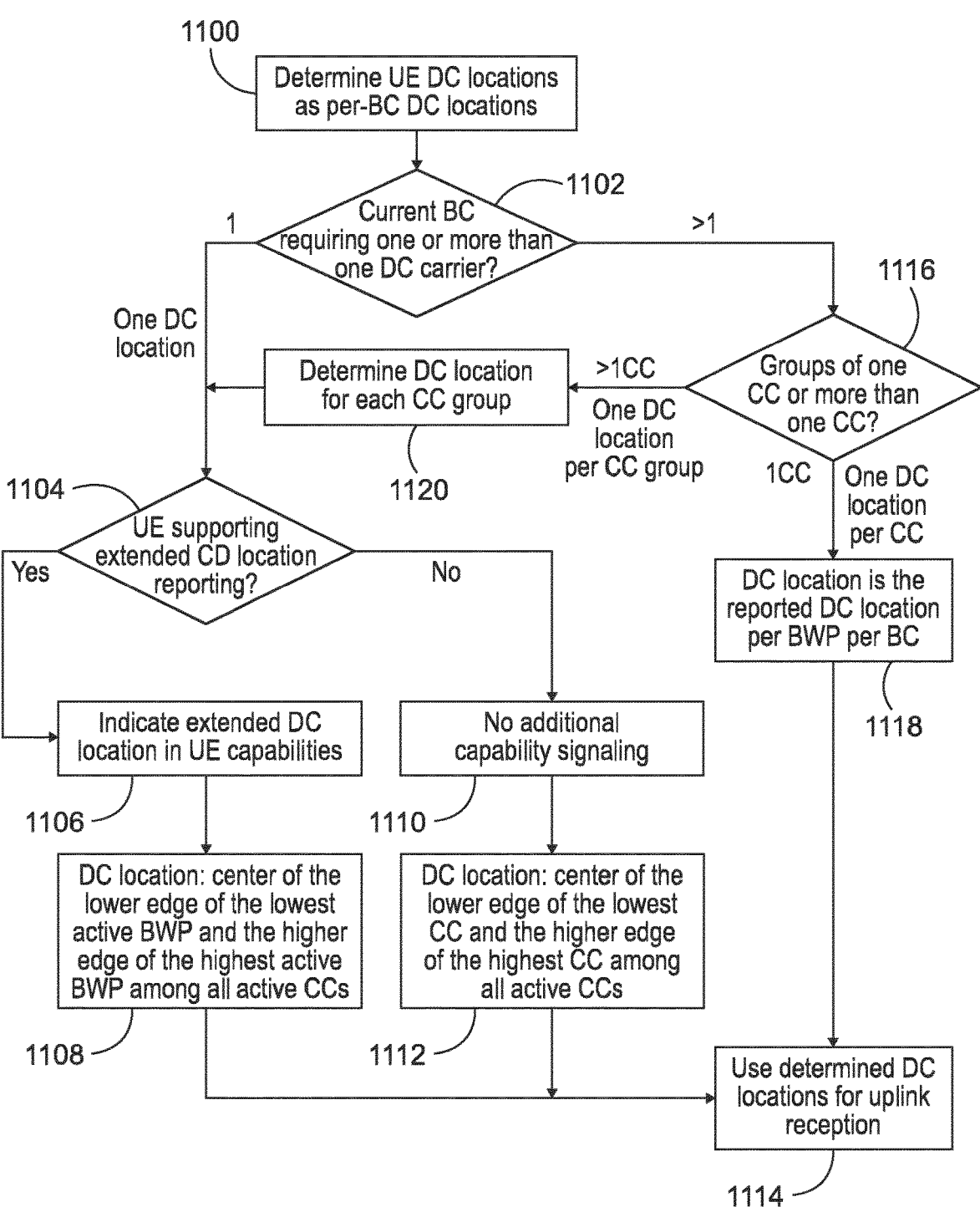
FIG. 11 shows a flow chart for UE for determining DC locations according various embodiments.

The flow chart of FIG. 11 illustrates a method and embodiments related thereto carried out by a UE for determining the DC locations to be reported to the network. The UE starts by determining (1100) the per-band combination DC locations. The UE determines (1102) if one or more uplink DC carriers are needed for the current band combination (BC). If only one DC carrier is needed, then only one DC location shall be determined. The UE checks (1104), whether the UE supports extended DC location reporting.

If the UE supports extended DC location reporting, the UE includes (1106) the extended DC location to be indicated in UE capabilities signalling, and determines (1108) the location of the DC carrier as the center of the lower edge of the lowest active bandwidth part (BWP) and the higher edge of the highest active BWP among all active component carriers (CC) in the radio band combination used by the UE. If the UE does not support extended DC location reporting, the UE decides (1110) to include no additional capability signalling, and determines (1112) the location of the DC carrier as the center of the lower edge of the lowest component carrier (CC) and the higher edge of the highest component carrier (CC) among all active component carriers (CC) in the radio band combination used by the UE. Then the UE indicates (1114) to the determined DC locations for each BC in UE capabilities signalling, and when requested, via RRC signalling.

If it is determined at step (1102) above that more than one DC carriers are needed, the UE determines (1116), if the groups of component carriers shall comprise one or more CCs. For each group consisting of a single CC, one DC location shall be determined. The DC location is reported (1118) according to the DC location report mechanism where a new syntax element extendedDC-LocationReporting-r16 has been included in the signalling syntax of CA-ParametersNR and then included for each BC via a parallel list of BandCombinationList similarly as shown for Band-CombinationList-v1540 and CA-Parameters-v1540 below.

```
BandCombinationList : :=            SEQUENCE (SIZE (1..maxBandComb) ) OF BandCombination
BandCombination : :=                SEQUENCE {
    bandList                            SEQUENCE (SIZE (1..maxSimultaneousBands) ) OF
BandParameters,
    featureSetCombination               FeatureSetCombinationId,
    ca-ParametersEUTRA                  CA-ParametersEUTRA
OPTIONAL,
    ca-ParametersNR                     CA-ParametersNR
OPTIONAL,
    mrdc-Parameters                     MRDC-Parameters
OPTIONAL,
    supportBandwidthCombinationSet      BIT STRING (SIZE (1..32) )
OPTIONAL,
    powerClass-v1530                    ENUMERATED {pc2}
OPTIONAL
}
CA-ParametersNR : :=                 SEQUENCE {
    dummy                                         ENUMERATED {supported}       OPTIONAL,
    parallelTxSRS-PUCCH-PUSCH                     ENUMERATED {supported}       OPTIONAL,
    parallelTxPRACH-SRS-PUCCH-PUSCH               ENUMERATED {supported}       OPTIONAL,
    simultaneousRxTxInterBandCA                   ENUMERATED {supported}       OPTIONAL,
    simultaneousRxTxSUL                           ENUMERATED {supported}       OPTIONAL,
    diffNumerologyAcrossPUCCH-Group               ENUMERATED {supported}       OPTIONAL,
    diffNumerologyWithinPUCCH-GroupSmallerSCS     ENUMERATED {supported}       OPTIONAL,
    supportedNumberTAG                            ENUMERATED {n2, n3, n4}      OPTIONAL,
    ...
}
BandCombinationList-v1540 : :=       SEQUENCE (SIZE (1..maxBandComb) ) OF BandCombination-
v1540
BandCombination-v1540: :=            SEQUENCE {
    bandList-v1540                      SEQUENCE (SIZE (1..maxSimultaneousNands) ) OF
BandParameters-v1540,
    ca-ParametersNR-v1540               CA-ParametersNR-v1540
OPTIONAL
}
CA-ParametersNR-v1540 : :=           SEQUENCE {
    simultaneousSRS-AssocCSI-RS-AllCC            INTEGER (5..32)              OPTIONAL,
    csi-RS-IM-ReceptionForFeedbackPerBandComb          SEQUENCE {
        maxNumberSimultaneousNZP-CSI-RS-ActBWP-AllCC    INTEGER (1..64)          OPTIONAL,
        totalNumberPortsSimultaneousNZP-CSI-RS-ActBWP-AllCC           INTEGER      (2..256)
OPTIONAL
    }                                                                            OPTIONAL,
    simultaneousCSI-ReportsAllCC                 INTEGER (5..32)              OPTIONAL,
    dualPA-Architecture                                ENUMERATED {supported|      OPTIONAL
}
BanndCombinationList-v16xy : :=      SEQUENCE (SIZE (1..maxBandComb) ) OF BandCombination-
v16xy
BandCombination-v16xy: :=            SEQUENCE {
    ca-ParametersNR-v16xy               CA-ParametersNR-v16xy
OPTIONAL
}
CA-ParametersNR-v16xy : :=           SEQUENCE {
    extendedDC-LocationReporting-r16                    ENUMERATED {supported}    OPTIONAL
}
``` according to 3GPP Release 15. Similarly, for each group consisting of a plurality of CCs, one DC location shall be determined (1120). For each of said groups, it is determined (1004) whether extended DC location reporting is applied or not. Depending on the result, either of the above steps (1106) or (1110) is carried out.

According to an embodiment, the UE capability for indicating support for the extended DC location reporting may be defined per-BC. It may be carried out, for example, similarly to dualPA-Architecture and the UE may signal, for example, a different value for each supported BC.

For example, the following signalling may be used for indicating support for the extended DC location reporting, According to an embodiment, a further capability indication may be added indicating whether the DC locations are using single- or dual-PA architecture assumption. Alternatively, the existing per-BC dual-PA capability dualPA-Architecture may be used for this purpose. Thus, the UE may be provided with more freedom in handling different band combinations according to different assumptions. For example, the following signalling may be used for indicating whether the DC locations are using single- or dual-PA architecture assumption, where a new syntax element dcLocation-Assumption-r16 has been included within the signalling syntax of UplinkTxDCList. Herein, a single assumption is considered valid for all BWPs in a serving cell.

```
UplinkTxDirectCurrentList : :=          SEQUENCE (SIZE (1..maxNrofServingCells) ) OF
UplinkTxDirectCurrentCell
UplinkTxDirectCurrentCell : :=     SEQUENCE {
   servCellIndex                     ServCellIndex,
   uplinkDirectCurrentBWP               SEQUENCE (SIZE (1..maxNrofBWPs) ) OF
UplinkTxDirectCurrentBWP, ...,
   [ [
   uplinkDirectCurrentBWP-SUL            SEQUENCE (SIZE (1..maxNrofBWPs) ) OF
UplinkTxDirectCurrentBWP        OPTIONAL
   ] ],
   [ [
   dcLocation-Assumption-r16        ENUMERATED {singlePA, dualPA}   OPTIONAL
   ] ]
}
UplinkTxDirectCurrentBWP : :=     SEQUENCE {
   bwp-Id                            BWP-Id,
   shift7dot5kHz                     BOOLEAN,
   txDirectCurrentLocation           INTEGER (0..3301)
}
```

The signalling may also provide for separate assumptions for each BWP in a serving cell. For example, the following signalling may be used therein, adding a further syntax element uplinkDirectCurrentBWP, which is then defined separately for each dcLocation-Assumption-r16 within the signalling syntax of UplinkTxDirectCurrentList.

Such an apparatus may likewise comprise: means for determining one or more uplink direct current (DC) carriers needed for a radio band combination (BC); means for determining locations of each DC carrier of the radio band combination, wherein said means comprise means for determining a location of at least one DC carrier of the radio band

```
UplinkTxDirectCurrentList : :=          SEQUENCE (SIZE (1..maxNrofServingCells) ) OF
UplinkTxDirectCurrentCell
UplinkTxDirectCurrentCell : :=     SEQUENCE {
   servCellIndex                     ServCellIndex,
   uplinkDirectCurrentBWP               SEQUENCE (SIZEE (1..maxNrofBWPs) ) OF
UplinkTxDirectCurrentBWP, ...,
   [ [
   uplinkDirectCurrentBWP-SUL               SEQUENCE (SIZE (1..maxNrofBWPs) ) OF
UplinkTxDirectCurrentBWP        OPTIONAL
   ] ],
   [ [
   uplinkDirectCurrentBWP-v16xy             SEQUENCE (SIZE (1..maxNrofBWPs) ) OF
UplinkTxDirectCurrentBWP-v16xy,
   ] ]
}
UplinkTxDirectCurrentBWP : :=     SEQUENCE {
   bwp-Id                            BWP-Id,
   shift7dot5kHz                     BOOLEAN,
   txDirectCurrentLocation           INTEGER (0..3301)
}
UplinkTxDirectCurrentBWP-v16xy : :=     SEQUENCE {
   dcLocation-Assumption-r16        ENUMERATED {singlePA, dualPA}       OPTIONAL
}
```

The method and the embodiments related thereto may be implemented in an apparatus implementing a user equipment (UE). The apparatus may comprise at least one processor and at least one memory, said at least one memory stored with computer program code thereon, the at least one memory and the computer program code configured to, with the at least one processor, cause the apparatus at least to perform: determine one or more uplink direct current (DC) carriers needed for a radio band combination (BC); determine locations of each DC carrier of the radio band combination, wherein said means comprise means for determining a location of at least one DC carrier of the radio band combination according to locations of bandwidth part (BWP) carriers and/or component carriers (CC); include an indicator about the location of the at least one DC carrier in an extended DC location reporting field in a UE capability indication; and signal at least said indicator in the UE capability indication.

combination according to locations of bandwidth part (BWP) carriers and/or component carriers (CC); means for including an indicator about the location of the at least one DC carrier in an extended DC location reporting field in a UE capability indication; and means for signalling at least said indicator in the UE capability indication.

Such apparatuses may comprise e.g. the functional units disclosed in any of the FIGS. 1, 2 and 3 for implementing the embodiments.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus comprising at least one processor and at least one memory, said at least one memory stored with computer program code thereon, the at least one memory and the computer program code configured to, with the at least one processor, cause the apparatus at least to:

determine one or more uplink direct current carriers needed for a radio band combination;

determine locations of each direct current carrier of the radio band combination, wherein a location of at least one direct current carrier of the radio band combination is determined according to locations of bandwidth part carriers and/or component carriers, wherein for said at least one direct current carrier, the location of the direct current carrier is determined based on one of the following:

a center of a lower edge of the lowest active bandwidth part and a higher edge of the highest active bandwidth part among all active component carriers in the radio band combination; or a center of a lower edge of the lowest component carrier and a higher edge of the highest component carrier among all active component carriers in the radio band combination;

include an indicator about the location of the at least one direct current carrier in a direct current location reporting field; and signal at least said indicator.

2. The apparatus according to claim 1, wherein the at least one memory and the computer program code configured to, with the at least one processor, further cause the apparatus at least to:

determine, in response to at least one of lowest and highest component carriers lacks an active bandwidth part, to replace the lacking bandwidth part by a corresponding component carrier for the determination of the location of the direct current carrier.

3. The apparatus according to claim 1, wherein the at least one memory and the computer program code configured to, with the at least one processor, further cause the apparatus at least to:

determine whether the radio band combination used by the apparatus comprises at least one group of a plurality of component carriers; and determine, in response to at least one group of only one component carrier is included in the radio band combination, that the location of the direct current per CC is a direct current location of a bandwidth part of said component carrier.

4. The apparatus according to claim 1, wherein the at least one memory and the computer program code configured to, with the at least one processor, further cause the apparatus at least to:

determine, in response to at least one group of a plurality of component carriers is included in the radio band combination, that one location of the direct current carrier per a group of a plurality of component carriers is defined; and determine the location of the direct current carrier as the center of the lower edge of the lowest active bandwidth part and the higher edge of the highest active bandwidth part among all active component carriers in the radio band combination used by the apparatus.

5. The apparatus according to claim 1, wherein the at least one memory and the computer program code configured to, with the at least one processor, further cause the apparatus at least to:

indicate support for extended direct current location reporting in a user equipment capability indication.

6. The apparatus according to claim 1, wherein the at least one memory and the computer program code configured to, with the at least one processor, further cause the apparatus at least to:

indicate whether the direct current locations are using single power amplifier or dual power amplifier architecture in a user equipment capability indication.

7. A method comprising:

determining, by an apparatus, one or more uplink direct current carriers needed for a radio band combination;

determining locations of each direct current carrier of the radio band combination, wherein a location of at least one direct current carrier of the radio band combination is determined according to locations of bandwidth part carriers and/or component carriers, wherein for said at least one direct current carrier, the location of the direct current carrier is determined based on one of the following:

a center of a lower edge of the lowest active bandwidth part and a higher edge of the highest active bandwidth part among all active component carriers in the radio band combination; or a center of a lower edge of the lowest component carrier and a higher edge of the highest component carrier among all active component carriers in the radio band combination;

including an indicator about the location of the at least one direct current carrier in a direct current location reporting field; and signalling at least said indicator.

8. The method according to claim 7, comprising:

determining, in response to at least one of lowest and highest component carriers lacks an active bandwidth part, to replace the lacking bandwidth part by a corresponding component carrier for the determination of the location of the direct current carrier.

9. The method according to claim 7, comprising:

determining whether the radio band combination used by the apparatus comprises at least one group of a plurality of component carriers; and determining, in response to at least one group of only one component carrier is included in the radio band combination, that the location of the direct current per component carrier is a direct current location of a bandwidth part of said component carrier.

10. The method according to claim 7, comprising:

determining, in response to at least one group of a plurality of component carriers is included in the radio band combination, that one location of the direct current carrier per a group of a plurality of component carriers is defined; and determining the location of the direct current carrier as the center of the lower edge of the lowest active bandwidth part and the higher edge of the highest active bandwidth part among all active component carriers in the radio band combination used by the apparatus.

11. The method according to claim 7, comprising:

indicating support for extended direct current location reporting in a user equipment capability indication.

12. The method according to claim 7, comprising:

indicating whether the direct current locations are using single power amplifier or dual power amplifier architecture in a user equipment capability indication.

13. An apparatus comprising at least one processor and at least one memory, said at least one memory stored with computer program code thereon, the at least one memory and the computer program code configured to, with the at least one processor, cause the apparatus at least to:

determine one or more uplink direct current carriers needed for a radio band combination;

determine locations of each direct current carrier of the radio band combination, wherein a location of at least one direct current carrier of the radio band combination is determined according to one of the following:

the location of the direct current carrier as a center of a lower edge of the lowest active bandwidth part and a higher edge of the highest active bandwidth part among all active component carriers in the radio band combination; or the location of the direct current carrier as a center of a lower edge of the lowest component carrier and a higher edge of the highest component carrier among all active component carriers in the radio band combination; and use the determined location of the direct current carrier for uplink transmission.

*    *    *    *    *